United States Patent
Gupte et al.

(10) Patent No.: US 7,797,476 B2
(45) Date of Patent: Sep. 14, 2010

(54) FLEXIBLE CONNECTION SCHEME BETWEEN MULTIPLE MASTERS AND SLAVES

(75) Inventors: Ajit Deepak Gupte, Karnataka (IN); Gregory R. Shurtz, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/233,910

(22) Filed: Sep. 19, 2008

(65) Prior Publication Data

US 2010/0077127 A1 Mar. 25, 2010

(51) Int. Cl.
*G06F 13/00* (2006.01)

(52) U.S. Cl. .................. 710/317; 710/110; 710/242; 710/243

(58) Field of Classification Search .............. 710/110, 710/119, 120, 242, 243, 317
See application file for complete search history.

(56) References Cited

U.S. PATENT DOCUMENTS

| 2005/0273544 A1* | 12/2005 | Fitzsimmons et al. | 710/317 |
| 2006/0149874 A1* | 7/2006 | Ganasan et al. | 710/110 |
| 2009/0119430 A1* | 5/2009 | Tsujimoto | 710/110 |
| 2010/0005213 A1* | 1/2010 | Butter et al. | 710/309 |

* cited by examiner

*Primary Examiner*—Glenn A Auve
(74) *Attorney, Agent, or Firm*—Robert D. Marshall, Jr.; W. James Brady; Frederick J. Telecky, Jr.

(57) ABSTRACT

The present invention describes a flexible routing scheme between masters and slaves in complex digital systems. The routing scheme is optimized for maximum versatility and configurability using switched resources in the form of configurable crossbar switches.

5 Claims, 3 Drawing Sheets

US 7,797,476 B2

FLEXIBLE CONNECTION SCHEME BETWEEN MULTIPLE MASTERS AND SLAVES

TECHNICAL FIELD OF THE INVENTION

The technical field of this invention is communication between master and slave devices.

BACKGROUND OF THE INVENTION

In conventional hardware systems, either system-on-chip (SOC) or discrete, there can be multiple master modules such as CPUs, DMAs, host processors or port interface elements that communicate with multiple slave peripherals. These peripherals include media and data ports and memory controllers. A single master can access many slave peripherals and a single peripheral needs to be accessed by many masters. The access route from a master to a slave may include multiple routing stages. These routing stages include address decoders, arbitration units, and frequency and width translation bridges.

This scheme works well for the applications that are well understood. However the application requirements are not always completely known when hardware system is being designed. The same hardware system can be used in multiple applications. In these situations fixed routes pose a limitation in achieving optimal performance.

FIG. 1 illustrates a prior art fixed routing scheme. Masters 101 through 105 control slaves 131, 132 and 139 via two crossbar switching networks SCR1 115 and SCR2 120. Master requests M1 through M3 are decoded in respective decoders 106, 107 and 108. These requests pass to arbitration unit 110. Arbitration unit 110 selects one of the requests coming from the multiple decoders 106, 107 or 108 based on priority and directs it to the intermediate point 109. Intermediate point 109 connects to a subsequent decoder 111. Master requests M4 and M5 are decoded in respective decoders 112 and 113. Arbitration units 121, 122 and 129 select one request signals from decoders 111, 112 and 113 for control of respective slaves 131, 132 and 139.

A request M1 to M3 from any one of masters 101 to 103 has to pass through two stages of arbitration at arbitration unit 110 and one of arbitration units 121, 122 and 129 before it can reach any of the destination slaves 131, 132 and 139. In contrast requests M4 or M5 from masters 104 or 105 see only one stage of arbitration at one of arbitration units 121, or 122 and 129. Clearly, the system illustrated in FIG. 1 is optimized for access for master requests M4 and M5. If the application requirement changes such that requests from any of the masters M1 through M3 need to be processed at a higher priority, or if these masters experience higher traffic than expected, then the system of FIG. 1 cannot adjust to this new requirement.

If the precise requirements of traffic from a master and concurrency of traffic with other masters are not known before design implementation, the safe approach would be add extra hardware to allow as many parallel accesses as possible. In above example, if the request profiles of masters M1 through M4 were not known, one design solution adds a separate port for all the masters M1 through M4 on SCR2. This would mean that a similar path to all the slaves S1 through S9 would have to be included for all the masters M1 through M4 in SCR2. This results in a significantly larger hardware design and can cause speed limitations or extra pipelining latency. Ignoring M5 since it represents any number of additional masters in the system, crossbar switching network SCR2 120 becomes a 4:10 crossbar instead of 2:10, doubling its size.

SUMMARY OF THE INVENTION

Complex digital systems include both master and slave devices with versatile communication requirements. A single master can access many slave peripherals and a single slave peripheral needs to be accessed by many masters. The access route from a master to a slave can include multiple routing stages. The present invention is a flexible routing scheme optimized for maximum versatility and configurability while achieving acceptable chip size and complexity.

BRIEF DESCRIPTION OF THE DRAWINGS

These and other aspects of this invention are illustrated in the drawings, in which.

DETAILED DESCRIPTION OF PREFERRED EMBODIMENTS

Figure 2:
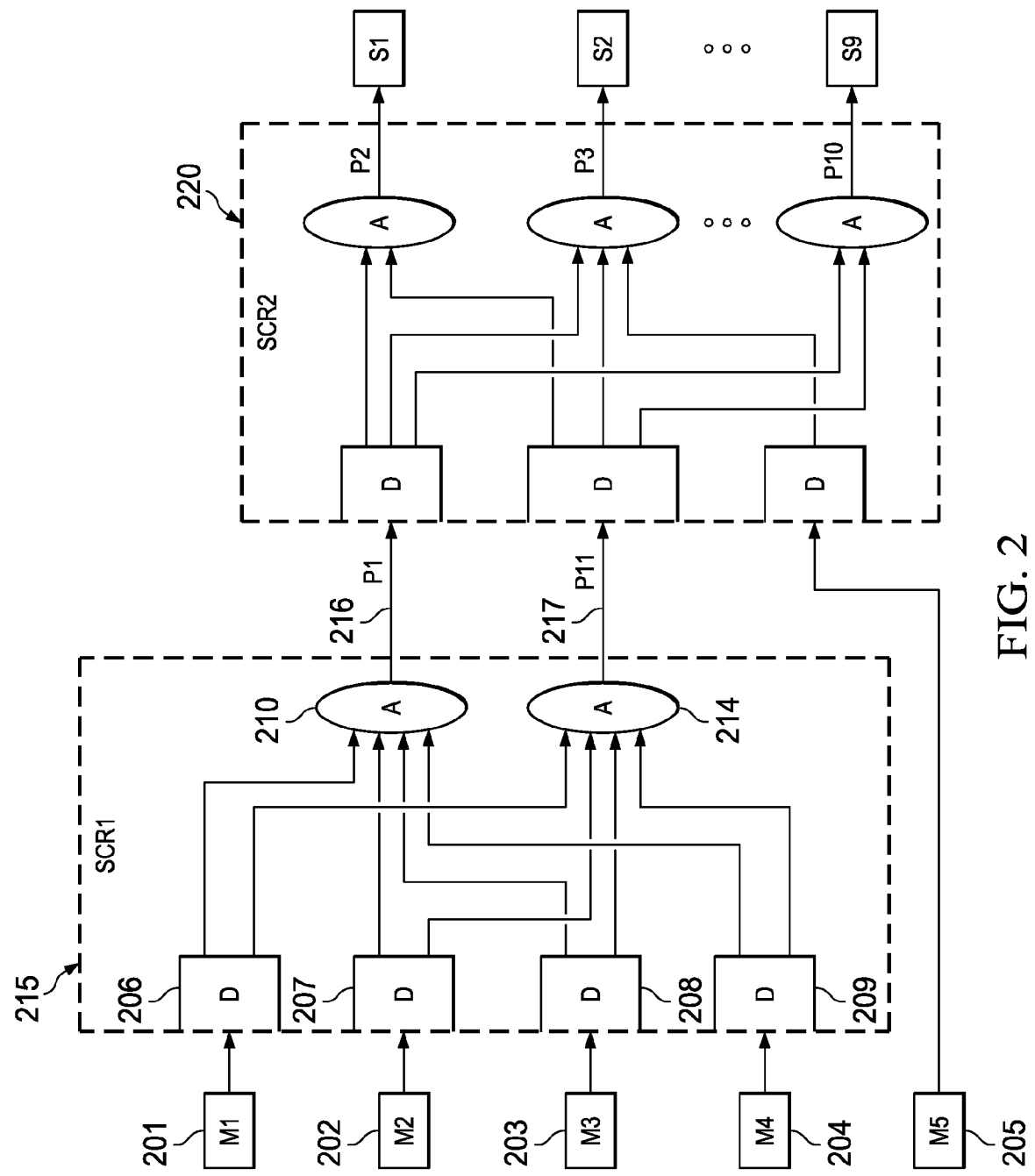
FIG. 2 illustrates the block diagram of the network connecting masters and slaves using a switched resource crossbar and flexible switching allowing for more versatile communication between masters and slaves.

FIG. 2 illustrates the flexible routing scheme of the present invention. This routing scheme provides maximum versatility and configurability while achieving acceptable chip size and complexity. Crossbar switching network 215 routes master requests M1 through M4 to either of two intermediate points, 216 or 217. The protocol determining the selection priorities for master requests reaching 216 or 217 are configurable.

In the example of the invention illustrated in FIG. 2, any of the masters 201 through 204 have access to either of two ports 216 and 217. Assuming the two ports 216 and 217 are identical, a subtle optimization lies in the possibility that one path for a given master could be deleted and while still permitting any possible grouping dividing all the masters between the two ports.

Figure 1:
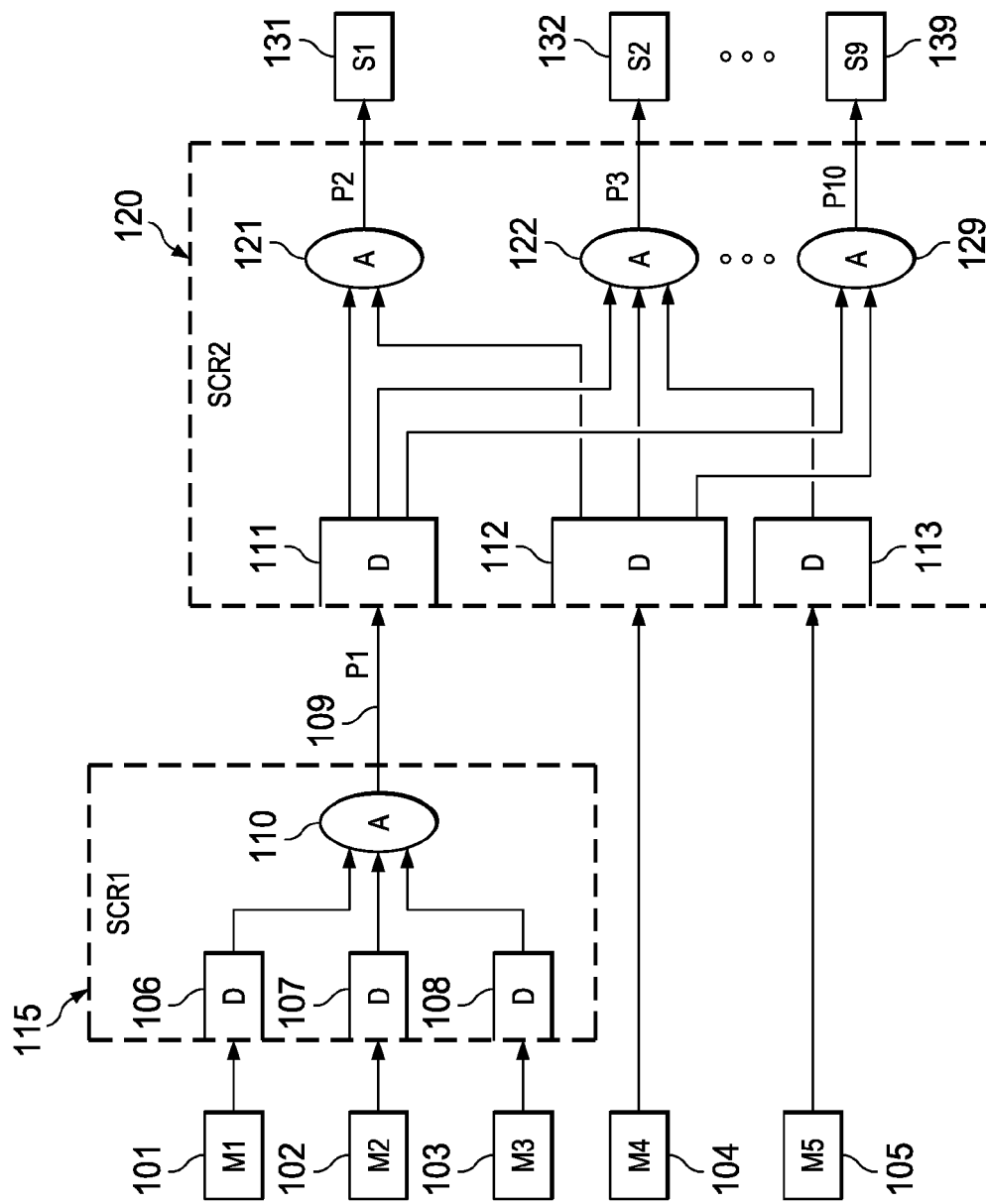
FIG. 1 illustrates the block diagram of a conventional network for communication between masters and slaves (Prior Art)

The bus infrastructure that lies beyond intermediate points 216 and 217 including crossbar switching network SCR2 220 is identical to crossbar switching network 120 illustrated in FIG. 1. As a result, a request coming from masters M1 through M4 can pass through the bus infrastructure via two possible routes. This gives flexibility to better tune the system as necessary to a particular application. For example, the system can be configured such that master M1 requests go to intermediate point 216 and masters M2 through M4 all send the requests to intermediate point 217.

In FIG. 2 crossbar switching network 215 is a complete crossbar capable of directing any master request to either intermediate point 216 or intermediate point 217. Any combination of routing connecting one of the masters to only one of the two intermediate points 216 or 217 is acceptable. For example, one could connect M1 to only P1, and M2, M3, M4 to P1 and P11. This still allows complete flexibility in terms of master grouping, while saving some hardware.

In the example of FIG. 2 two ports connect crossbar switching network SCR1 215 to crossbar switching network SCR2 220. This concept is scaleable to serve the total needed system bandwidth and latency requirements of all the masters on crossbar switching network SCR1 215. The concept is valid with 2 to n ports. The trade off between flexibility and size must be made and more flexibility moves the design closer to a full crossbar switching network. Optimum benefit results from using the minimal number of ports that gives the most added flexibility.

Figure 3:
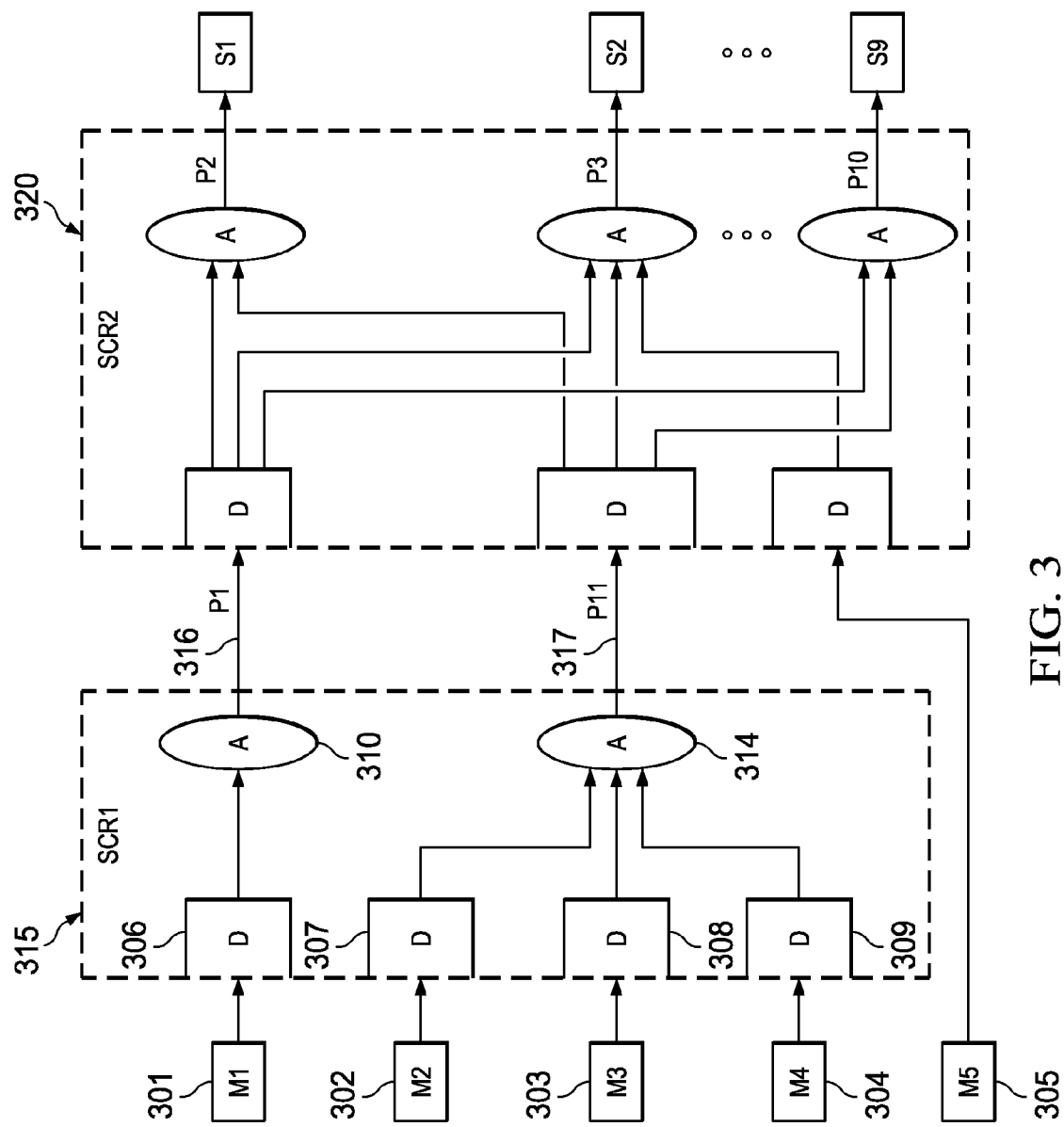
FIG. 3 illustrates the system of FIG. 2, configured to give priority to master M1.

FIG. 3 illustrates the system of FIG. 2, configured to give priority to master M1 301. The request coming from master M1 301 does not have to contend with any other master requests M2 302, M3 303 or M4 304 before it reaches crossbar switching network SCR2 320. Any other grouping of M1 through M4 is possible as required. Configuration is accomplished by: (1) software reprogramming all connections from decoders 307, 308, and 309 to the arbitration unit 310; and (2) reprogramming the connection from decoder 306 to arbitration unit 310 exclusively.

In FIG. 2 a request from master M1 201 can reach slave S1 either as M1 to P1 to P2 to S1 or as M1 to P11 to P2 to S1. Most significant address bits are decoded to forward the request towards appropriate slave point or intermediate point.

Without any change in hardware, a request coming from a master is always forwarded to one of the possible points in the bus structure. Thus, for example in FIG. 1, crossbar switching network SCR2 120 has nine endpoints P2 through P10. The total address space is divided among the slaves S1 through S9. Depending upon the request address, a request coming from any of the masters to crossbar switching network SCR2 120 via intermediate point P1 109, master M4 104 or master M5 105 will go to one of the slaves 131 through 139.

In FIG. 2, it is desirable to send a request from the masters served by crossbar switching network SCR1 215 to either of the intermediate points P1 216 or P11 217. This is achieved by extending the address space by one bit. The decoders then decode one extra bit of address. A most significant bit is added to the address bus of the request coming from each master. Configuration registers drive this bit. It FIG. 2 including four masters, four configuration register bits are needed. If the MSB is 1 the decoders in crossbar switching network SCR1 forward a request to intermediate point P11 217. If the MSB is 0, the request is forwarded to point intermediate point P1 216.

A second important modification that is sometimes necessary is master identification (ID). In some protocols the slave devices send read data and status as well as write status information back to the master. This information is routed to the master by the bus infrastructure using master ID information that traveled along with the request to the slave, sent back from the slave along with the information status and data information. As an example, suppose master M1 201 did a read request to slave S1. The configuration bit for master M1 201 is set such that all master M1 201 requests are directed to intermediate point P11. Read data information reaching point P2 from slave S1, will have to be sent to intermediate point P11, so that the return data travels a similar path as the request. This is necessary for consistency in the switch hardware states, apart from managing traffic. However, without any modification to the master ID, crossbar switching network SCR2 220 would not know the difference between intermediate points P1 and P11. Thus crossbar switching network SCR2 220 would not know to which node it should send back the data.

For this reason, the master IDs of the masters M1 to M4 are also modified with the configuration bit. For example, if master ID for master M1 was 001, then, the modified master ID looks like X001 where X can be either 0 or 1 based on the value in the configuration register for M1. With this addition the flexible routing scheme is complete.

FIG. 2 illustrates a flexible 4:2 router. This scheme can be easily generalized and expanded for greater flexibility. An m:n flexible router may be accommodated by appending additional bits to the most significant address bits.

Consider a system having m masters that need flexible connectivity to support access to n nodes with n<m. This implies use of an m:n crossbar switching network to provide flexible connection that allows any partitioning of m masters into n disjoint subsets. Let M1 to Mm be the masters and Out01 to Outn be the outputs of the flexible crossbar switching network. The number of extra address bits required to be decoded by the flexible crossbar switching network is $$\text{ceil}(\log_2(N))$$

where: the ceil function is the nearest integer bigger than the log value; and $\log_2(N)$ is the base 2 logarithm of N.

The m:n scheme can be optimized for area without loss of generality such that:

1. One of the outputs, such as Out01, is connected to all the masters M1 to Mm;
2. A second output, such as Out02, is connected to all but one of the masters, such as M2 to Mm;
3. A third output, such as Out03 is connected to all but two masters, such as M3 to Mm;
4. Repeating for all outputs.

Consider the specific example of a 6:3 flexible connectivity scheme. Because there are three outputs, we have $\text{ceil}(\log_2(3))=2$ required extra bits. Note: $\text{ceil}(\log_2(3))=\text{ceil}(1.585)=2$. Thus two extra address bits are required to drive the master requests to the desired flexible output. In this manner one can create a flexible crossbar switching network with 6 inputs and 3 outputs, allowing any possible partitions of the 6 inputs to be connected to one of the outputs. This invention conserves chip area using this optimization without losing any flexibility.

Further analysis of the m:n case reveals that any possible partitioning of masters is allowable. Ideally, the m:n path optimization described above should be achieved in such a way that it should result in minimum change in software as well as minimum change in hardware protocol. The m:n case of this invention achieves both. First, there is minimal software change needed because it required programming just a few configuration bits. Secondly, there is no change to the hardware protocol. All the existing systems can benefit from this technique without any change. Thirdly, compared to the prior art that adds two extra decode points in crossbar switching network SCR2 significantly increasing hardware cost, this invention is cheaper in terms of chip area. Fourthly, this invention is less likely to degrade system speed.

What is claimed is:

1. A switching circuit for connecting a first plurality of master devices to second plurality of slave devices via a third plurality of intermediate nodes less than the first plurality comprising:

a first crossbar switching network connected to a first subset of master devices including a first set of decoders, each of said first set of decoders connected to a corresponding one of said first subset of master devices, each decoder receiving an access request from said corresponding master device including a target address and determining a target slave device corresponding to said target address, and a first set of at least two arbitration units, each arbitration unit selectively connected to at least one of said first set of decoders, each arbitration unit receiving decoded access requests from said selectively connected decoders and granting access to a corresponding intermediate point to only one requesting master device; and a second crossbar switching network including
a second set of decoders, each of said second set of decoders connected to a corresponding intermediate point, each decoder receiving an access request from said corresponding intermediate point including a target address and determining a target slave device corresponding to said target address,
a third set of decoders, each of said third set of decoders connected to a corresponding one of a second subset of master devices distinct from said first subset of master devices, each decoder receiving an access request from said corresponding master device including a target address and determining a target slave device corresponding to said target address, and
a second set of at least three arbitration units, each arbitration unit connected to each of said first set of decoders and said second set of decoders, each arbitration unit receiving decoded access requests from said connected decoders and granting access to a corresponding slave device to only one requesting master device.

2. The switching circuit of claim 1, wherein:
said first set of decoders selectively connect to said first set of arbitration units corresponding to predetermined target address bits generated by said first subset of master devices.

3. The switching circuit of claim 2, wherein:
said predetermined target address bits consist of added most significant bits.

4. The switching circuit of claim 2, wherein:
each of said first set of decoders includes at least one selectively settable configuration bit corresponding to each of said first subset of master devices, each of said first set of decoders selectively connecting a particular one of said first subset of master devices to one of said first set of arbitration units corresponding to a current state of said at least one configuration bit corresponding to said particular one of said first subset of master devices.

5. The switching circuit of claim 1, wherein:
each master device includes a unique identification code, each master device transmitting is unique identification code in each access request;
each of said first set of arbitration units transmitting to said corresponding intermediate point an extended unique identification code corresponding to said master device granted access and said arbitration unit;
at least one slave device transmitting an access response including the unique identification code of said master device granted access;
said second crossbar switching network switching said access response to said master device granted access including switching said access response to said intermediate point corresponding to an extended unique identification code.

* * * * *